(12) United States Patent
Tomura et al.

(10) Patent No.: US 7,439,008 B2
(45) Date of Patent: Oct. 21, 2008

(54) OPTICAL RECORDING MEDIUM, AND, METHOD AND APPARATUS FOR OPTICAL RECORDING AND REPRODUCING USING OPTICAL RECORDING MEDIUM

(75) Inventors: Tatsuya Tomura, Tokyo (JP); Tsutomu Sato, Yokohama (JP); Yasunobu Ueno, Yokohama (JP); Soh Noguchi, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 226 days.

(21) Appl. No.: 11/236,783

(22) Filed: Sep. 27, 2005

(65) Prior Publication Data
US 2006/0035172 A1 Feb. 16, 2006

Related U.S. Application Data

(63) Continuation of application No. PCT/JP2005/001310, filed on Jan. 25, 2005.

(30) Foreign Application Priority Data
Jan. 30, 2004 (JP) .............................. 2004-023324

(51) Int. Cl.
G11B 7/24 (2006.01)
(52) U.S. Cl. .................. 430/270.16; 430/945; 428/64.8; 369/283
(58) Field of Classification Search ....................... None
See application file for complete search history.

(56) References Cited

U.S. PATENT DOCUMENTS

| | | | |
|---|---|---|---|
| 5,604,004 A | | 2/1997 | Suzuki et al. |
| 5,645,910 A | * | 7/1997 | Burns et al. ................. 428/64.1 |
| 6,383,722 B1 | * | 5/2002 | Shinkai et al. ............... 430/321 |
| 2003/0068576 A1 | * | 4/2003 | Satoh et al. ............ 430/270.16 |
| 2003/0206514 A1 | * | 11/2003 | Noguchi et al. ............. 369/288 |

FOREIGN PATENT DOCUMENTS

| | | | |
|---|---|---|---|
| JP | 8-295079 | | 11/1996 |
| JP | 9-95520 | | 4/1997 |
| JP | 9-193546 | | 7/1997 |
| JP | 10-151862 | | 6/1998 |
| JP | 10-151863 | | 6/1998 |
| JP | 10-152623 | | 6/1998 |
| JP | 10-154350 | | 6/1998 |
| JP | 2791944 | | 6/1998 |
| JP | 10-337958 | | 12/1998 |
| JP | 2001-23235 | | 1/2001 |
| JP | 2001023235 | * | 1/2001 |
| JP | 2002-11950 | | 1/2002 |
| JP | 2002-11953 | | 1/2002 |
| JP | 2002011953 | * | 1/2002 |
| JP | 2002-274033 | | 9/2002 |
| JP | 2002-283722 | | 10/2002 |
| JP | 2002-293027 | * | 10/2002 |
| JP | 2003-145939 | | 5/2003 |
| JP | 3456621 | | 8/2003 |
| WO | WO00/75111 A1 | | 12/2000 |

* cited by examiner

*Primary Examiner*—Martin J Angebranndt
*Assistant Examiner*—Anna L Verderame
(74) *Attorney, Agent, or Firm*—Cooper & Dunham LLP

(57) ABSTRACT

The object of the present invention is to provide an optical recording medium in which a recording material of the optical recording medium has a high solubility in an organic solvent, so that the recording material can be shaped to film by a coating process and the recording material is excellent in light-resistance and stability during the preservation, so that the optical recording medium is applicable to the recordable DVD. For the object, the present invention provides the optical recording medium comprising a substrate and at least a recording medium disposed on the substrate, wherein the recording medium comprises at least one type of formazan-metal chelate dyes.

16 Claims, 4 Drawing Sheets

OPTICAL RECORDING MEDIUM, AND, METHOD AND APPARATUS FOR OPTICAL RECORDING AND REPRODUCING USING OPTICAL RECORDING MEDIUM

CROSS-REFERENCE TO RELATED APPLICATIONS

This is a continuation of application Ser. No. PCT/JP2005/001,310, filed on Jan. 25, 2005.

BACKGROUND OF THE INVENTION

1. Field of the Invention

The present invention relates to an optical recording medium in which at least one of the recording, reproducing and recording-once of information is performed by irradiating a light to a recording material comprising a dye which has a high solubility in an organic solvent and is excellent in light-resistance, stability during the preservation and recording properties, thereby causing an optical change, such as a change in transmittance or reflectance in a recording material, and, method and apparatus for the optical recording and reproducing.

2. Description of the Related Art

Recently, the development of DVD±R is proceeding. For improving the recording capacity, it is necessary to develop a recording material for the microminiaturization of the recording pit, a technique for the image compression which is represented by Moving Picture Experts Group-2 (MPEG2) and a technique for lowering the wavelength of a semi-conductor laser used for reading the recording pit.

Up until now, as a semi-conductor laser, only a barcode reader and a diode for an AlGaInP laser having a wavelength of 670 nm which is used for a measuring instrument have been commercialized; however, accompanying with rendering an optical disc to have a high-density, a red laser has started to be used in full-scale in the optical storage market.

In the case of DVD drive, the light source is standardized by two wavelengths, such as 635 nm and 660 nm for a laser diode. On the other hand, DVD-ROM drive for Read Only is commercialized with a wavelength of 650 nm. In such a situation, the most preferred DVD±R medium is a medium in which the recording and reproducing can be performed with a light having a wavelength of from 630 to 700 nm.

As a dye used for a DVD±R optical recording medium, a dye which is excellent in recording properties, light-resistance and stability during the preservation is desired.

Recently, as a dye for a recording material, the development of a dye, such as a polymetine dye, an azo-metal-chlate dye, a cyanine dye, a squarylium dye and other complex compound dyes, is proceeding.

The cyanine dye and the squarylium dye are excellent in optical properties and have satisfactory signal properties; however, the above-noted dyes have poor light-resistance, so that almost of them are not practicable, when they are used individually as a dye for the optical recording medium. For improving the above-noted poor light-resistance of an optical recording medium produced using the above-noted dyes, the development of a light stabilizer used in combination with the dyes is proceeding; however, there are a few combinations of a dye and a light stabilizer which can obtain both the function of light stabilizing and satisfactory signal properties.

On the other hand, a formazan-metal chlate dye among the above-noted azo-metal chlate dyes is known as a dye having extremely high light stability and an application thereof as a material for the optical recording is attempted in many times (see Japanese Patent (JP-B) Nos. 2791944 and 3456621; Japanese Patent Application Laid-Open (JP-A) Nos. 08-295079, 09-95520, 09-193546, 10-337958, 10-151862, 10-151863, 10-152623 and 10-154350; International Publication No. WO 00/75111 and JP-A Nos. 2001-23235, 2002-11950, 2002-11953, 2002-274033, 2002-283722, 2002-293027 and 2003-145939).

In nearly all of the above-noted cases of attempts to apply the formazan-metal chlate dye as a material for the optical recording, a wavelength of a light absorbed by the dye was too large, so that it was difficult to satisfy all of signal qualities and recording qualities as the optical recording medium.

Therefore, an optical recording medium in which the recording, reproducing and additional recording of information can be performed by irradiating a light to a recording material comprising a dye which has a high solubility in an organic solvent and is excellent in light-resistance, stability during the preservation and recording properties, thereby causing an optical change, such as a change in transmittance or reflectance in a recording material has not been attained and a swift attainment thereof is nowadays desired.

SUMMARY OF THE INVENTION

The object of the present invention is to provide an optical recording medium in which a recording material of the optical recording medium has a high solubility in an organic solvent, so that the recording material can be shaped to film by a coating process and the recording material is excellent in light-resistance and stability during the preservation, so that the optical recording medium is applicable to the Write Once Read Many (recordable) DVD, and further, by introducing a fluorine atom or a fluorinated alkyl group to the recording material, the water repellency thereof can be improved, so that it is suppressed that the recording material is buried in a guide groove and excellent recording signal qualities (such as excellent jitter properties, sensitivity, modulation degree and push-pull signal properties) of the recording medium can be obtained, and, a method and an apparatus for the optical recording and reproducing using the optical recording medium.

<1> An optical recording medium comprising:

a substrate, and at least a recording layer disposed on the substrate in which the recording layer comprises at least one type of formazan-metal chelate dyes represented by the following formula (1):

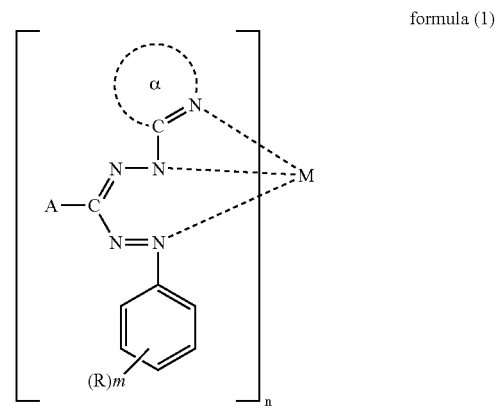

formula (1)

wherein a ring "α" represents any one of a pyridazine ring, a pyrimidine ring, a pyrazine ring, a triazine ring, a thiadiazole ring and an imidazole ring, which may be substituted by a substituent; "A" represents any one of an alkyl group which may contain a substituent, an unsubstituted aryl group, an aryl group containing another substituent than a fluorinated alkyl group, an alkenyl group which may contain a substituent and a heterocycle residue which may contain a substituent; "R" represents one of a fluorine atom and a fluorinated alkyl group; "m" is a natural number representing the number of "R" and when "m" is 2 or more, "R"s may be the same or different from each other; "M" represents one of a metal atom and a metal compound; and "n" represents the number of a formazan ligand coordinating "M" and is one of 1, 2 and 3.

<2> The optical recording medium according to item <1> above, wherein the ring "α" is any one of a pyridazine ring, a pyrimidine ring, a pyrazine ring and a triazine ring.

<3> The optical recording medium according to any one of items <1> and <2> above, wherein "M" is one member selected from the group consisting of iron, cobalt, nickel, cupper, zinc and palladium.

<4> The optical recording medium according to any one of items <1> to <3> above,
wherein the recording layer comprises a mixture of a formazan-metal chelate dye represented by the formula (1) and a light-absorbable dye having a wavelength corresponding to the maximum light absorbance of from 550 to 630 nm.

<5> The optical recording medium according to item <4> above,
wherein the light-absorbable dye is at least one member selected from the group consisting of a polymetine dye, an azo-metal chelate dye, a squarylium dye and a squarylium-metal chelate dye.

<6> The optical recording medium according to any one of items <4> and <5> above,
wherein the mixing mass ratio (A:B) between the formazan-metal chelate dye (A) represented by the formula (1) and the light-absorbable dye (B) is from 1:9 to 9:1.

<7> The optical recording medium according to any one of items <1> to <6> above,
wherein the ratio of a residual light absorbing ability of the recording layer which was exposed to a light of a xenon lamp having an illuminance of 50,000 lux for 10 hours to an initial light absorbing ability of the recording layer, is 70% or more.

<8> The optical recording medium according to any one of items <1> to <7> above,
wherein with respect to a light having a wavelength of from the wavelength which is shorter than the wavelength of the light used for the recording and reproducing by 5 nm to the wavelength which is longer than the wavelength of the light used for the recording and reproducing by 5 nm, the recording layer as an individual layer has a refractive index "n" of from 1.5 to 3.0 and an extinction coefficient "k" of from 0.02 to 0.2.

<9> The optical recording medium according to any one of items <1> to <8> above,
wherein the recording layer has a thickness of from 10 nm to 10 μm.

<10> The optical recording medium according to any one of items <1> to <9> above,
wherein the substrate has guide grooves having a track pitch of from 0.7 to 0.8 μm and the groove has a width of from 0.18 to 0.40 μm in terms of a half bandwidth.

<11> The optical recording medium according to item <10> above,
wherein a guide groove has a depth of from 100 to 250 nm.

<12> The optical recording medium according to any one of items <1> to <11> above,
wherein a reflective layer is disposed on the recording layer.

<13> The optical recording medium according to item <12> above,
wherein the reflective layer comprises one member selected from the group consisting of gold, silver, copper, aluminum and a metal alloy thereof.

<14> The optical recording medium according to any one of items <12> and <13> above,
wherein a protective layer is disposed on the reflective layer.

<15> The optical recording medium according to any one of items <1> to <14> above,
wherein an undercoating layer is disposed between the substrate and the recording layer.

<16> A method for recording and comprising:
irradiating a light having a wavelength of from 630 to 700 nm to the optical recording medium at the surface of the substrate, and
performing at least one of the recording and reproducing of signal information in the recording layer,
wherein the optical recording medium is the optical recording medium according to any one of items <1> to <15>. In accordance with the method for recording and reproducing the optical recording medium according to the present invention described in the item <16>, at least one of the recording and reproducing of information can be efficiently performed stably and reliably, <17> An apparatus for the optical recording and reproducing comprising:
an irradiator configured to irradiate a light from a light source to the optical recording medium for performing at least one of the optical recording and reproducing,
wherein the optical recording medium is the optical recording medium according to any one of items <1> to <15>. In accordance with the method for recording and reproducing the optical recording medium according to the present invention described in the item <16>, at least one of the recording and reproducing of information can be efficiently performed stably and reliably.

Figure 1A:
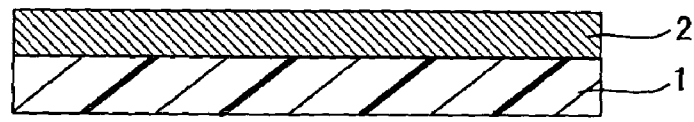
FIG. 1A schematically exemplifies the layer composition of the recordable optical recording medium according to the present invention which comprises the recording layer disposed on the substrate.

DESCRIPTION OF THE PREFERRED EMBODIMENTS (Optical Recording Medium)

The optical recording medium according to the present invention comprises the substrate and at least the recording layer disposed on the substrate, further the reflective layer, the protective layer, the undercoating layer, the adhesive layer, the protective substrate and optionally other layers which are disposed on the substrate in this order.

In the above-noted optical recording medium, at least one of the recording and reproducing of signal information in the recording medium is (are) performed by irradiating a light having the wavelength of from 630 to 700 nm to the surface of the substrate in the recording medium.

The above-noted optical recording medium is an optical recording medium in which the recording layer comprises at least one type of formazan-metal chelate dyes represented by the following formula (1):

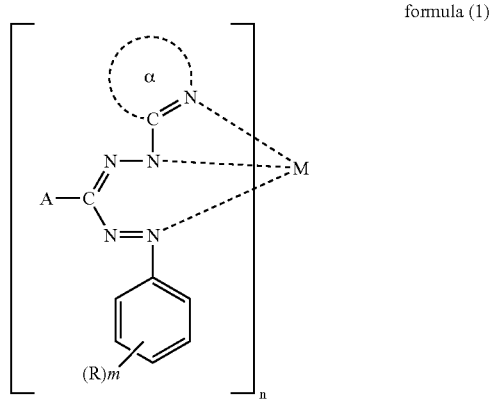

formula (1)

wherein a ring "α" represents any one of a pyridazine ring, a pyrimidine ring, a pyrazine ring, a triazine ring, a thiadiazole ring and an imidazole ring, which may be substituted by a substituent; "A" represents any one of an alkyl group which may contain a substituent, an unsubstituted aryl group, an aryl group containing another substituent than a fluorinated alkyl group, an alkenyl group which may contain a substituent and a heterocycle residue which may contain a substituent; "R" represents one of a fluorine atom and a fluorinated alkyl group; "m" is a natural number representing the number of "R" and when "m" is 2 or more, "R"s may be the same or different from each other; "M" represents one of a metal atom and a metal compound; and "n" represents the number of a formazan ligand coordinating "M" and is one of 1, 2 and 3.

In the formula (1), the metal "M" is not restricted so long as "M" is a metal or a metal compound which can form a chelate compound with a formazan compound and may be properly selected depending on the application. Examples of the metal "M" include titanium, vanadium, chromium, manganese, iron, cobalt, nickel, copper, zinc, zirconium, niobium, molybdenum, technetium, ruthenium, rhodium, palladium, and oxides and halides thereof. Among them, iron, cobalt, nickel, copper, zinc and palladium are preferred and the optical recording medium according to the present invention in which the recording layer comprises a formazan-metal chelate compound comprising at least one of the above-noted preferred metals is excellent in optical properties. Among the above-noted halides of the metal, a chloride of the metal is preferably used.

In addition, the number "n" of formazan ligands is varied depending on the type of the metal "M" and usually is one of 1, 2, and 3. When "n" is 2 or more, formazan ligands may be the same or different from each other.

In the formula (1), the ring "α" represents an unsubtituted or substituted 5- or 6-membered ring containing a nitrogen.

Specific examples of the ring "α" include an imidazole ring, a thiadiazole ring, a pyridazine ring, a pyrimidine ring, a pyrazine ring and a triazine ring. Among them, particularly a pyridazine ring, a pyrimidine ring, a pyrazine ring and a triazine ring are more preferred. Further, to the ring "α", a substituent may be bonded.

Specific examples of the above-noted substituent bonded to the ring "α" include independently a halogen atom, a nitro group, a cyano group, a hydroxyl group, a carboxyl group, an amino group, a carbamoyl group, an alkyl group which may contain a substituent, an aryl group which may contain a substituent, a heterocycle group which may contain a substituent, an alkoxy group which may contain a substituent, an aryloxy group which may contain a substituent, an alkylthio group which may contain a substituent, an arylthio group which may contain a substituent, an alkylamino group which may contain a substituent, an arylamino group which may contain a substituent, an alkoxycarbonyl group which may contain a substituent, an aryloxycarbonyl group which may contain a substituent, an alkylcarboxyamido group which may contain a substituent, an arylcarboxyamido group which may contain a substituent, an alkylcarbamoyl group which may contain a substituent, an arylcarbamoyl group which may contain a substituent, an alkenyl group which may contain a substituent and an alkylsulfamoyl group which may contain a substituent. The number of carbon atoms either in the alkyl group or in a portion of an arkyl group of the above-noted substituent containing the alkyl group is preferably from 1 to 15, more preferably from 1 to 8.

In the formula (1), "A" represents any one of an alkyl group which may contain a substituent, an unsubstituted aryl group, an aryl group containing another substituent than a fluorinated alkyl group, an alkenyl group which may contain a substituent and a heterocycle residue which may contain a substituent. In this case, the alkyl group and the alkenyl group include a chain-formed group and a ring-formed group. The number of carbon atoms either in the alkyl group or in a portion of an arkyl group of the above-noted substituent containing the alkyl group is preferably from 1 to 15, more preferably from 1 to 8. The number of carbon atoms in the above-noted alkenyl group is preferably from 2 to 8, more preferably from 2 to 6.

Among them, "A" is particularly preferably an aryl group, most preferably an aryl group containing a substituent. Preferred examples of the substituent contained in the aryl group containing a substituent include a halogen atom, an alkyl group, an alkoxy group, a cyano group and a nitro group.

Preferred specific examples of the above-noted alkyl group which may contain a substituent (as a specific example of the substituent bonded to the ring "α" or as "A") include a $C_1$ to $C_{15}$ alkyl group, such as a straight alkyl group, such as a methyl group, an ethyl group, a n-propyl group, a n-butyl group, a n-pentyl group, a n-hexyl group, a n-heptyl group, a n-octyl group, a n-nonyl group, a n-decyl group; a branched alkyl group, such as an isobutyl group, an isoamyl group, a 2-methylbutyl group, a 2-methylpentyl group, a 3-methylpentyl group, a 4-methylpentyl group, a 2-ethylbutyl group, a 2-methylhexyl group, a 3-methylhexyl group, a 4-methylhexyl group, a 5-methylhexyl group, a 2-ethylpentyl group, a 3-ethylpentyl group, a 2-methylheptyl group, a 3-methylheptyl group, a 4-methylheptyl group, a 5-methylheptyl group, a 2-ethylhexyl group, a 3-ethylhexyl group, an isopropyl group, a sec-butyl group, a 1-ethylpropyl group, a 1-methylbutyl group, a 1,2-dimethylpropyl group, a 1-methylheptyl group, a 1-ethylbutyl group, a 1,3-dimethylbutyl group, a 1,2-dimethylbutyl group, a 1-ethyl-2-methylpropyl group, a 1-methylhexyl group, a 1-ethylheptyl group, a 1-propylbutyl group, a 1-isopropyl-2-methylpropyl group, a 1-ethyl-2-methylbutyl group, a 1-propyl-2-methylpropyl group, a 1-methylheptyl group, a 1-ethylhexyl group, a 1-propylpentyl group, a 1-isopropylpentyl group, a 1-isopropyl-2-methylbutyl group, a 1-isopropyl-3-methylbutyl group, a 1-methyloctyl group, a 1-ethylheptyl group, a 1-propylhexyl group, a 1-isobutyl-3-methylbutyl group, a neopentyl group, a tert-butyl group, a tert-hexyl group, a tert-amyl group, a tert-octyl group; and a cycloalkyl group, such as a cyclohexyl group, a 4-methylcyclohexyl group, a 4-ethylcyclohexyl group, a 4-tert-butylcyclohexyl group, a 4-(2-ethylhexyl)cyclohexyl group, a bornyl group, an isobornyl group and an adamantyl group. Among them, a $C_1$ to $C_8$ alkyl group is preferred.

The above-noted alkyl group (as a specific example of the substituent bonded to the ring "α" or as "A") may be substituted by any one of a hydroxyl group, a halogen atom, a nitro group, a carboxyl group, a cyano group; and an aryl group and a heterocycle group which may contain a specific substituent (e.g., a halogen atom or a nitro group). In addition, the above-noted alkyl group may be substituted by another hydrocarbon group than the above-noted alkyl group itself through a hetero atom, such as an oxygen atom, a sulfur atom and a nitrogen atom.

Examples of the alkyl group substituted by another hydrocarbon group through an oxygen atom include an alkyl group substituted by an alkoxy group or an aryloxy group, such as a methoxymethyl group, a methoxyethyl group, an ethoxymethyl group, an ethoxyethyl group, a butoxyethyl group, an ethoxyethoxyethyl group, a phenoxyethyl group, a methoxypropyl group and an ethoxypropyl group. These alkoxy group and aryloxy group may contain a substituent.

Examples of the alkyl group substituted by another hydrocarbon group through a sulfur atom include an alkyl group substituted by an alkylthio group or an arylthio group, such as a methylthioethyl group, an ethylthioethyl group, an ethylthiopropyl group and a phenylthioethyl group. These alkylthio group and arylthio group may contain a substituent.

Examples of the alkyl group substituted by another hydrocarbon group through a nitrogen atom include an alkyl group substituted by an alkylamino group or an arylamino group, such as a dimethylaminoethyl group, a diethylaminoethyl group, a diethylaminopropyl group and a phenylaminomethyl group. These alkylamino group and arylamino group may contain a substituent.

Preferred specific examples of the above-noted alkenyl group which may contain a substituent (as a specific example of the substituent bonded to the ring "α" or as "A") include a $C_2$ to $C_8$ alkenyl group, such as a vinyl group, an aryl group, a 1-propenyl group, a methacryl group, a crotyl group, a 1-butenyl group, a 3-butenyl group, a 2-pentenyl group, a 4-pentenyl group, a 2-hexenyl group, a 5-hexenyl group, a 2-heptenyl group and a 2-octenyl group. The alkenyl group may contain the same substituent as the above-noted substituent which the alkyl group may contain.

Specific examples of the above-noted aryl group which may contain a substituent (as a specific example of the substituent bonded to the ring "α") or which is an unsubstituted aryl group or contains another substituent than a fluorinated alkyl group (as "A") include a phenyl group, a naphtyl group, an anthranyl group, a fluorenyl group, a phenalenyl group, a phenanthranyl group, a triphenylenyl group and a pyrenyl group.

The aryl group may be substituted by any one of an alkyl group, an alkenyl group, a hydroxyl group, a halogen atom, a nitro group, a carboxyl group, a cyano group, a trifluoromethyl group, an aryl group which may contain a specific substituent (e.g., a halogen atom and a nitro group) and a heterocycle which may contain a specific substituent (e.g., a halogen atom and a nitro group). In this case, examples of the alkyl group, the alkenyl group and the aryl group include respectively the alkyl group above-exemplified as the specific example, the alkenyl group above-exemplified as the specific example and the aryl group above-exemplified as the specific example. Examples of the halogen atom include a halogen atom exemplified below.

Specific examples of the above-noted heterocycle group which may contain a substituent (as a specific example of the substituent bonded to the ring "α" or as "A") include a furyl group, a thienyl group, a pyrrolyl group, a benzofuranyl group, an isobenzofuranyl group, a benzothienyl group, an indolinyl group, an isoindolinyl group, a carbazolyl group, a pyridyl group, a piperidyl group, a quinolyl group, an isoquinolyl group, an oxazolyl group, an isooxazolyl group, a thiazolyl group, an isothiazolyl group, an imidazolyl group, a pyrazolyl group, a benzimidazolyl group, a pyrazyl group, a pyrimidyl group, a pyridazinyl group and a quinoxalinyl group.

The heterocycle group may be substituted by any one of a hydroxyl group, an alkyl group, a halogen atom, a nitro group, a carboxyl group, a cyano group, an aryl group which may contain a specific group (e.g., a halogen atom and a nitro group) and a heterocycle which may contain a specific group (e.g., a halogen atom and a nitro group). The heterocycle group may be also substituted by a hydrocarbon group, such as the above-exemplified alkyl group through a hetero atom, such as an oxygen atom, a sulfur atom and a nitrogen atom. In this case, examples of the alkyl group, the alkenyl group and the aryl group include respectively the alkyl group above-exemplified as the specific example, the alkenyl group above-exemplified as the specific example and the aryl group above-exemplified as the specific example. Examples of the halogen atom include a halogen atom exemplified below.

Examples of the halogen atom which is noted above as a substituent by which the above-exemplified alkyl group, alkenyl group or aryl group may be substituted include a fluorine atom, a chlorine atom, a bromine atom and an iodine atom.

The alkoxy group which may contain a substituent, which is noted above as a specific example of the substituent bonded to the heterocycle "α" may be any one of alkoxy groups in which to the oxygen atom, an alkyl group which may contain a substituent is directly bonded. In this alkyl group, specific examples of the alkyl group include alkyl groups above-exemplified as the specific example and specific examples of the substituent include substituents above-exemplified as a substituent which the alkyl group may contain.

The aryloxy group which may contain a substituent, which is noted above as a specific example of the substituent bonded to the heterocycle "α" may be any one of aryloxy groups in which to the oxygen atom, an aryl group which may contain a substituent is directly bonded. In this aryl group, specific examples of the aryl group include aryl groups above-exemplified as the specific example and specific examples of the substituent include substituents above-exemplified as a substituent which the aryl group may contain.

The alkylthio group which may contain a substituent, which is noted above as a specific example of the substituent bonded to the heterocycle "α" may be any one of alkylthio groups in which to the sulfur atom, an alkyl group which may contain a substituent is directly bonded. In this alkyl group, specific examples of the alkyl group include alkyl groups above-exemplified as the specific example and specific examples of the substituent include substituents above-exemplified as a substituent which the alkyl group may contain.

The arylthio group which may contain a substituent, which is noted abovw as a specific example of the substituent bonded to the heterocycle "α" may be any one of arylthio groups in which to the sulfur atom, an aryl group which may contain a substituent is directly bonded. In this aryl group, specific examples of the aryl group include aryl groups above-exemplified as the specific example and specific examples of the substituent include substituents above-exemplified as a substituent which the aryl group may contain.

The alkylamino group which may contain a substituent, which is noted above as a specific example of the substituent bonded to the heterocycle "α" may be any one of alkylamino groups in which to the nitrogen atom, an alkyl group which may contain a substituent is directly bonded. In this alkyl group, specific examples of the alkyl group include alkyl groups above-exemplified as the specific example and specific examples of the substituent include substituents above-exemplified as a substituent which the alkyl group may contain. In addition, the alkylamino group may be also an alkylamino group in which a ring, such as a piperidino group, a morpholino group, a pyrrolidinyl group and a piperazinyl group, is formed by bonding an alkyl group to another alkyl group through an oxygen atom and a nitrogen atom.

The arylamino group which may contain a substituent, which is noted above as a specific example of the substituent bonded to the heterocycle "α" may be any one of arylamino groups in which to the nitrogen atom, an aryl group which may contain a substituent is directly bonded. In this aryl group, specific examples of the aryl group include aryl groups above-exemplified as the specific example and specific examples of the substituent include substituents above-exemplified as a substituent which the aryl group may contain.

The alkylcarbonyl group which may contain a substituent, which is noted above as a specific example of the substituent bonded to the heterocycle "α" may be any one of alkylcarbonyl groups in which to the carbon atom in the carbonyl group, an alkyl group which may contain a substituent is directly bonded. In this alkyl group, specific examples of the alkyl group include alkyl groups above-exemplified as the specific example and specific examples of the substituent include substituents above-exemplified as a substituent which the alkyl group may contain.

The arylcarbonyl group which may contain a substituent, which is noted above as a specific example of the substituent bonded to the heterocycle "α" may be any one of arylcarbonyl groups in which to the carbon atom in the carbonyl group, an aryl group which may contain a substituent is directly bonded. In this aryl group, specific examples of the aryl group include aryl groups above-exemplified as the specific example and specific examples of the substituent include substituents above-exemplified as a substituent which the aryl group may contain.

The alkoxycarbonyl group which may contain a substituent, which is noted above as a specific example of the substituent bonded to the heterocycle "α" may be any one of alkoxycarbonyl groups in which to the oxygen atom, an alkyl group which may contain a substituent is directly bonded. In this alkyl group, specific examples of the alkyl group include alkyl groups above-exemplified as the specific example and specific examples of the substituent include substituents above-exemplified as a substituent which the alkyl group may contain.

The aryloxycarbonyl group which may contain a substituent, which is noted above as a specific example of the substituent bonded to the heterocycle "α" may be any one of aryloxycarbonyl groups in which to the oxygen atom, an aryl group which may contain a substituent is directly bonded. In this aryl group, specific examples of the aryl group include aryl groups above-exemplified as the specific example and specific examples of the substituent include substituents above-exemplified as a substituent which the aryl group may contain.

The alkylcarboxamide group which may contain a substituent, which is noted above as a specific example of the substituent bonded to the heterocycle "α" may be any one of alkylcarboxamide groups in which to the carbon atom in the carboxamide group, an alkyl group which may contain a substituent is directly bonded. In this alkyl group, specific examples of the alkyl group include alkyl groups above-exemplified as the specific example and specific examples of the substituent include substituents above-exemplified as a substituent which the alkyl group may contain.

The arylcarboxamide group which may contain a substituent, which is noted above as a specific example of the substituent bonded to the heterocycle "α" may be any one of arylcarboxamide groups in which to the carbon atom in the carboxamide group, an aryl group which may contain a substituent is directly bonded. In this aryl group, specific examples of the aryl group include aryl groups above-exemplified as the specific example and specific examples of the substituent include substituents above-exemplified as a substituent which the aryl group may contain.

The alkylcarbamoyl group which may contain a substituent, which is noted above as a specific example of the substituent bonded to the heterocycle "α" may be any one of alkylcarbamoyl groups in which to the nitrogen atom in the carbamoyl group, an alkyl group which may contain a substituent is directly bonded. In this alkyl group, specific examples of the alkyl group include alkyl groups above-exemplified as the specific example and specific examples of the substituent include substituents above-exemplified as a substituent which the alkyl group may contain. In addition, the alkylcarbamoyl group may be also an alkylcarbamoyl group in which a ring, such as a piperidino group, a morpholino group, a pyrrolidinyl group and a piperazinyl group, is formed by bonding an alkyl group to another alkyl group through an oxygen atom and a nitrogen atom.

The arylcarbamoyl group which may contain a substituent, which is noted above as a specific example of the substituent bonded to the heterocycle "α" may be any one of arylcarbamoyl groups in which to the nitrogen atom in the carbamoyl group, an aryl group which may contain a substituent is directly bonded. In this aryl group, specific examples of the aryl group include aryl groups above-exemplified as the specific example and specific examples of the substituent include substituents above-exemplified as a substituent which the aryl group may contain.

The alkylsulfamoyl group which may contain a substituent, which is noted above as a specific example of the substituent bonded to the heterocycle "α" may be any one of alkylsulfamoyl groups in which to the nitrogen atom in the sulfamoyl group, an alkyl group which may contain a substituent is directly bonded. In this alkyl group, specific examples of the alkyl group include alkyl groups above-exemplified as the specific example and specific examples of the substituent include substituents above-exemplified as a substituent which the alkyl group may contain.

In the formula (1), "R" represents a fluorine atom or a fluorinated alkyl group and "m" is a natural number representing the number of "R". When "m" is 2 or more, "R"s may be the same or different from each other. "m" can be structurally any one of from 1 to 5 and is, from the viewpoint of the production method of the compound, preferably any one of from 1 to 2.

Preferred specific examples of the above-noted alkyl group in the fluorinated alkyl group as "R" which may contain a substituent (as a specific example of the substituent bonded to the ring "α" or as "A") include a $C_1$ to $C_{15}$ alkyl group, such as a straight alkyl group, such as a methyl group, an ethyl group, a n-propyl group, a n-butyl group, a n-pentyl group, a n-hexyl group, a n-heptyl group, a n-octyl group, a n-nonyl group, a n-decyl group; a branched alkyl group, such as an isobutyl group, an isoamyl group, a 2-methylbutyl group, a 2-methylpentyl group, a 3-methylpentyl group, a 4-methylpentyl group, a 2-ethylbutyl group, a 2-methylhexyl group, a 3-methylhexyl group, a 4-methylhexyl group, a 5-methylhexyl group, a 2-ethylpentyl group, a 3-ethylpentyl group, a 2-methylheptyl group, a 3-methylheptyl group, a 4-methylheptyl group, a 5-methylheptyl group, a 2-ethylhexyl group, a 3-ethylhexyl group, an isopropyl group, a sec-butyl group, a 1-ethylpropyl group, a 1-methylbutyl group, a 1,2-dimethylpropyl group, a 1-methylheptyl group, a 1-ethylbutyl group, a 1,3-dimethylbutyl group, a 1,2-dimethylbutyl group, a 1-ethyl-2-methylpropyl group, a 1-methylhexyl group, a 1-ethylheptyl group, a 1-propylbutyl group, a 1-isopropyl-2-methylpropyl group, a 1-ethyl-2-methylbutyl group, a 1-propyl-2-methylpropyl group, a 1-methylheptyl group, a 1-ethylhexyl group, a 1-propylpentyl group, a 1-isopropylpentyl group, a 1-isopropyl-2-methylbutyl group, a 1-isopropyl-3-methylbutyl group, a 1-methyloctyl group, a 1-ethylheptyl group, a 1-propylhexyl group, a 1-isobutyl-3-methylbutyl group, a neopentyl group, a tert-butyl group, a tert-hexyl group, a tert-amyl group, a tert-octyl group; and a cycloalkyl group, such as a cyclohexyl group, a 4-methylcyclohexyl group, a 4-ethylcyclohexyl group, a 4-tert-butylcyclohexyl group, a 4-(2-ethylhexyl)cyclohexyl group, a bornyl group, an isobornyl group and an adamantyl group. Among them, a $C_1$ to $C_8$ alkyl group is preferred.

Here, specific examples of a formazan-metal chelate dye represented by the formula (1) are shown in the following Table 1-1 to 1-7. In Table 1-1 to 1-7, the substituents "α", "A" and "Y" correspond respectively to α, A and Y in the following formula (2) representing a formazan-metal chelate dye, and "Ph" and "Naph" represent respectively a phenyl group and a naphtyl group.

TABLE 1

| No. | α | A | Y | M | n |
|---|---|---|---|---|---|
| 1 | thiadiazole | —CH(CH$_3$)$_2$ | 2-CF$_3$-phenyl | Ni | 1 |
| 2 | thiadiazole | phenyl | 2-F-phenyl | Ti | 2 |

TABLE 1-continued

| No. | α | A | Y | M | n |
|-----|---|---|---|---|---|
| 3 | 2-methyl-1,3,4-thiadiazol-5-yl | —CH(CH₃)₂ | 2-(trifluoromethyl)phenyl | Cu | 2 |
| 4 | 4,5-dicyano-2-methyl-1H-imidazol-1-yl | 2-fluorophenyl | 2-(trifluoromethyl)phenyl | Zn | 2 |
| 5 | 1-ethyl-4,5-dicyano-2-methylimidazol-1-yl | 2,5-dimethylphenyl | 2-(trifluoromethyl)phenyl | Zn | 2 |
| 6 | 4,5-dicyano-2-methyl-1H-imidazol-1-yl | phenyl | 2-(trifluoromethyl)phenyl | Cr | 3 |
| 7 | 2-methylpyrimidin-2-yl | —CH₂—CH=CH₂ | 2-(trifluoromethyl)phenyl | Cu | 2 |
| 8 | 2-methylpyrimidin-2-yl | 2,4-dichlorophenyl | 2-(trifluoromethyl)phenyl | Ni | 2 |
| 9 | 2-methylpyrimidin-2-yl | pyridin-2-yl | 2-(trifluoromethyl)phenyl | Ni | 2 |
| 10 | 5-ethyl-2-methylpyrimidin-2-yl | 2-chlorophenyl | 2-fluorophenyl | Cr | 3 |

TABLE 1-continued
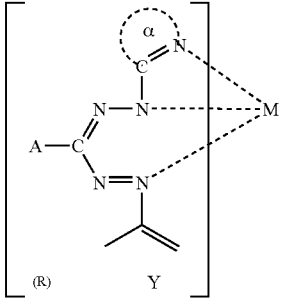
| No. | α | A | Y | M | n |
|---|---|---|---|---|---|
| 11 | 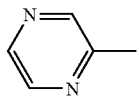 | 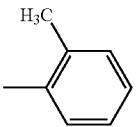 | 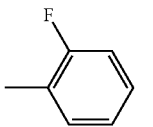 | Ni | 2 |
| 12 | 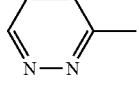 | 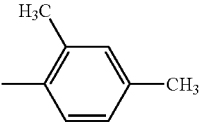 | 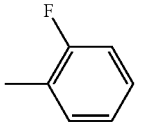 | Zn | 2 |
| 13 | 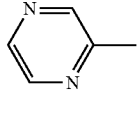 | 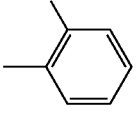 | 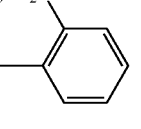 | Co | 3 |
| 14 | 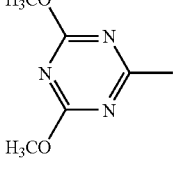 | —CH$_2$—CH=CH$_2$ | 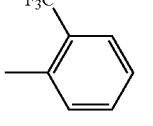 | Ni | 2 |
| 15 | 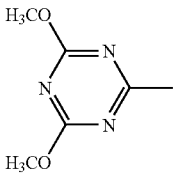 | 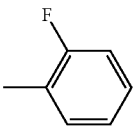 | 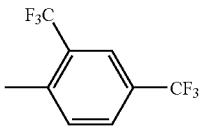 | Ni | 2 |
| 16 | 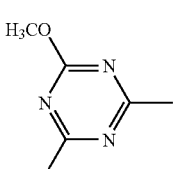 | 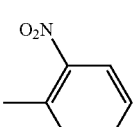 | 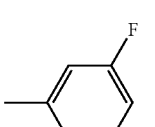 | Ni | 2 |
| 17 | 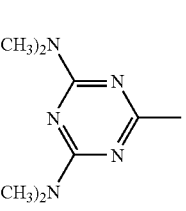 | 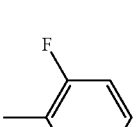 | 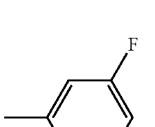 | Ni | 2 |

TABLE 1-continued

[Structure: a chelate complex with ligand containing C=N (α), N—N, A—C, N=N—(isopropenyl group with Y substituent), coordinated to M, with (R) and n subscript]

| No. | α | A | Y | M | n |
|-----|---|---|---|---|---|
| 18 | 2,4-bis(dimethylamino)-1,3,5-triazin-6-yl [(CH₃)₂N, (CH₃)₂N] | 2,4-dimethylphenyl (H₃C, CH₃) | 3-fluorophenyl (F) | Mn | 2 |
| 19 | 2,4-bis(dimethylamino)-1,3,5-triazin-6-yl [(CH₃)₂N, (CH₃)₂N] | 2-fluorophenyl (F) | 3-(trifluoromethyl)phenyl (CF₃) | Ni | 2 |
| 20 | 2,4-diamino-1,3,5-triazin-6-yl (H₂N, H₂N) | 4-pyridyl | 3-(trifluoromethyl)phenyl (CF₃) | Ni | 2 |
| 21 | 2,4-bis(2,2,2-trifluoroethoxy)-1,3,5-triazin-6-yl (F₃CH₂CO, F₃CH₂CO) | 1-naphthyl | 3-(trifluoromethyl)phenyl (CF₃) | Ni | 2 |
| 22 | 2,4-bis(2,2,2-trifluoroethoxy)-1,3,5-triazin-6-yl (F₃CH₂CO, F₃CH₂CO) | 3-pyridyl | 3-(trifluoromethyl)phenyl (CF₃) | Fe | 2 |
| 23 | 2,4-bis(2,2,2-trifluoroethoxy)-1,3,5-triazin-6-yl (F₃CH₂CO, F₃CH₂CO) | 3-pyridyl | 3-fluorophenyl (F) | Cu | 2 |

TABLE 1-continued
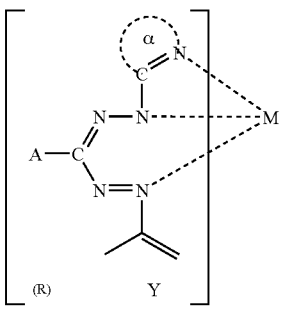
| No. | α | A | Y | M | n |
|---|---|---|---|---|---|
| 24 | 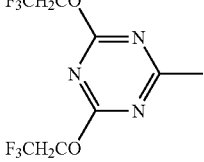 F₃CH₂CO, F₃CH₂CO-triazine | 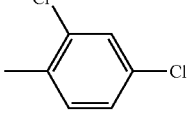 2,4-dichlorophenyl | 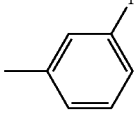 3-F-phenyl | Pd | 2 |
| 25 | 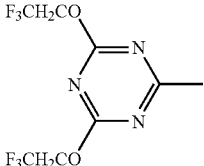 F₃CH₂CO, F₃CH₂CO-triazine | 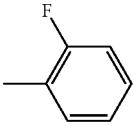 2-F-phenyl | 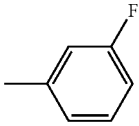 3-F-phenyl | Ni | 2 |
| 26 | 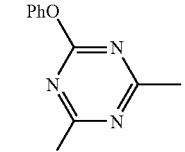 PhO, PhO-triazine | 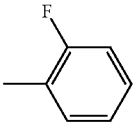 2-F-phenyl | 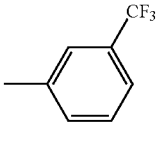 3-CF₃-phenyl | Ni | 2 |
| 27 | 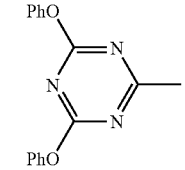 PhO, PhO-triazine | 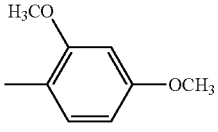 2-OCH₃, 4-OCH₃-phenyl | 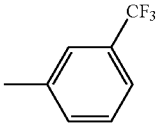 3-CF₃-phenyl | Ni | 2 |
| 28 | 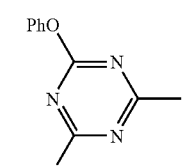 PhO, PhO-triazine | 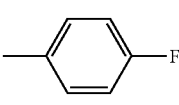 4-F-pyridyl | 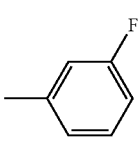 3-F-phenyl | Ni | 2 |
| 29 | 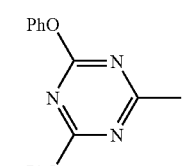 PhO, PhO-triazine | 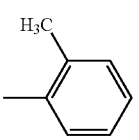 2-CH₃-phenyl | 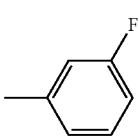 3-F-phenyl | Ni | 2 |

TABLE 1-continued

| No. | α | A | Y | M | n |
|---|---|---|---|---|---|
| 30 | 2,4-bis(PhO)-1,3,5-triazin-6-yl | 4-cyanophenyl | 3-fluorophenyl | Fe | 2 |
| 31 | 2,4-bis(PhO)-1,3,5-triazin-6-yl | 1-naphthyl | 3-(trifluoromethyl)phenyl | Ni | 2 |
| 32 | 2,4-bis(PhO)-1,3,5-triazin-6-yl | 2,4-dimethylphenyl | 3-(trifluoromethyl)phenyl | Ni | 2 |
| 33 | 2-PhO-4-$H_3CO$-1,3,5-triazin-6-yl | 2-methylphenyl | 3-(trifluoromethyl)phenyl | Ni | 2 |
| 34 | 2-PhO-4-$H_3CO$-1,3,5-triazin-6-yl | 2,4-difluorophenyl | 3-fluorophenyl | Co | 3 |
| 35 | 2-PhO-4-$H_3CO$-1,3,5-triazin-6-yl | 2-methoxyphenyl | 3-fluorophenyl | Ni | 2 |

TABLE 1-continued
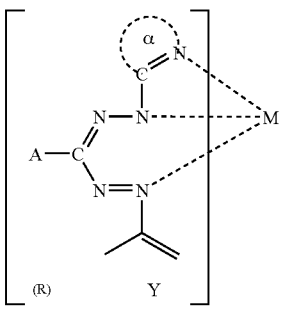
| No. | α | A | Y | M | n |
|---|---|---|---|---|---|
| 36 | NaphO, NaphO (triazine) | 4-F-C6H4 | 3-CF3-C6H4 | Ni | 2 |
| 37 | NaphO, NaphO (triazine) | 2-CH3-C6H4 | 3-CF3-C6H4 | Ni | 2 |
| 38 | NaphO, NaphO (triazine) | 2,4-(CH3)2-C6H3 | 4-CF3-C6H4 | Ni | 2 |
| 39 | NaphO, NaphO (triazine) | 2-OCH3-C6H4 | 4-CF3-C6H4 | Zn | 1 |
| 40 | PhO, H2N (triazine) | 2-F-C6H4 | 4-CF3-C6H4 | Ni | 2 |
| 41 | PhS, PhS (triazine) | 2-Cl-C6H4 | 4-F-C6H4 | Ni | 2 |

TABLE 1-continued

| No. | α | A | Y | M | n |
|---|---|---|---|---|---|
| 42 | PhS-triazine-PhS | naphthyl | 4-F-phenyl | Cu | 2 |
| 43 | PhS-triazine-PhS | —CH=CH—phenyl | 3-CF$_3$-phenyl | Ni | 2 |

When a formazan-metal chelate dye represented by the formula (1) (according to the present invention) is used as a light stabilizer, the formazan-metal chelate dye according to the present invention is mixed with another dye having a wavelength corresponding to the maximum light absorbance of from 550 to 630 nm, to be used. In this case, it is preferred that the formazan-metal chelate dye according to the present invention absorbs a light having a longer wavelength than the wavelength which is shorter than the wavelength corresponding to a maximum light absorbance of another dye by 50 nm. By selecting the above-noted combination of a formazan-metal chelate dye according to the present invention and another dye which have respectively the above-noted range of the wavelength for the light absorption, with respect to the light having a wavelength of from 630 to 700 nm which is longer than a wavelength of the light which the above-noted combination of dyes absorbs, a largest refractive index of the above-noted combination of dyes for the recording material according to the present invention can be obtained, so that not only the adaptability of a semi-conductive laser having an oscillated laser wavelength of from 630 to 700 nm can be obtained, but also the largest efficiency (modulation degree) of the recording and reproducing can be obtained.

The mixing mass ratio (A:B) between the formazan-metal chelate dye (A) represented by the formula (1) according to the present invention and the above-noted another dye (B) having a wavelength corresponding to the maximum light absorbance of from 550 to 630 nm is preferably from 1:9 to 9:1, more preferably from 3:7 to 7:3.

In addition, by mixing the dye according to the present invention with another dye to take advantage of properties of another dye, it can be expected that the sensitivity and reflectance of the recording layer can be enhanced; therefore, by changing the mixing ratio between the dye according to the present invention and another dye, a property of the dye used for the recording layer which will be improved can be improved.

Preferred examples of the above-noted another dye having a wavelength corresponding to the maximum light absorbance of from 550 to 630 nm include a polymethine dye, an azo-metal chelate dye, a squarylium dye and a squarylium-metal chelate dye.

Further, the recording layer may optionally comprise other components, such as other dyes, a polymer material, a stabilizer, a dispersant, a flame retardant, a lubricant, an anti-static agent, a surfactant and a platicizer.

Examples of the other dyes include a naphthalocyanine dye, a phthalocyanine dye, a croconium dye, a pyrylium dye, a naphthoquinone dye, an anthraquinone (indanthrene) dye, a xanthene dye, a triphenylmethane dye, an azulene dye, a tetrahydrocholine dye, a phenanthrene dye, a triphenotiazine dye and a metal complex compound dye.

Examples of the polymer material include an iomer resin, a polyamide resin, a vinyl resin, a natural polymer, a silicone, a liquid lubber and a mixture thereof with a silane coupling agent which is produced by dispersing into each other. Examples of the stabilizer include a complex of a transition metal.

As an optical property of the recording layer according to the present invention, it is preferred that the recording layer has a large wavelength range for the light absorption of the recording layer, in which a wavelength is less than the wavelength of the light used for the recording and reproducing of from 630 to 700 nm and the wavelength of the light used for the recording and reproducing is located around the largest wavelength in the above-noted wavelength range. That means, with respect to the light for the recording and reproducing having the wavelength of from 630 to 700 nm, the recording layer has a large refractive index and a large extinction coefficient.

More specifically, it is preferred that with respect to a light having a wavelength of from the wavelength which is shorter than the wavelength of the light used for the recording and reproducing by 5 nm to the wavelength which is longer than the wavelength of the light used for the recording and reproducing by 5 nm, the recording layer as an individual layer has a refractive index "n" of from 1.5 to 3.0 and an extinction coefficient "k" of from 0.02 to 0.2. When the recording layer has "n" of 1.5 or more, it is preferred that a satisfactory optical change thereof can be obtained and the modulation degree of the recording becomes high. On the other hand, when the recording layer has "n" of 3.0 or less, it is preferred that the dependency of the modulation degree on the wavelength may not become high and even if the wavelength of a light which the recording layer absorbs is in the wavelength range of the light used for the recording and reproducing, a reading error may be hardly caused. When "k" is 0.02 or more, it is preferred that recording sensitivity becomes high and when "k" is 0.2 or less, it is preferred that a reflectance of 50% or more can be easily obtained. In addition, the larger the absorptivity of the recording layer is, the larger the refractive index "n" of the recording layer which can be obtained is; therefore, it is preferred that log $\epsilon$ ($\epsilon$ represents molar absorptivity) is 5 or more.

As the light stability of the recording layer, the ratio of a residual light absorbing ability of the recording layer which was exposed to a light of a xenon lamp having an illuminance of 50,000 lux for 10 hours to an initial light absorbing ability of the recording layer, is preferably 70% or more, more preferably 80% or more, most preferably 90% or more.

Further, it is preferred that as light-resistance, the recording layer has reading stability during repeating of reading for 1,000,000 times and such fastness properties that the recording layer may not fade, when it is left to stand in a room.

Hereinbelow, explanations are given with respect to the layer composition of the optical recording medium according to the present invention.

Figure 1B:
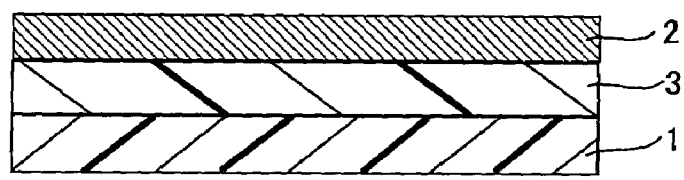
FIG. 1B schematically exemplifies the layer composition of the recordable optical recording medium according to the present invention which comprises the undercoating layer disposed between the substrate and the recording layer.
Figure 1C:
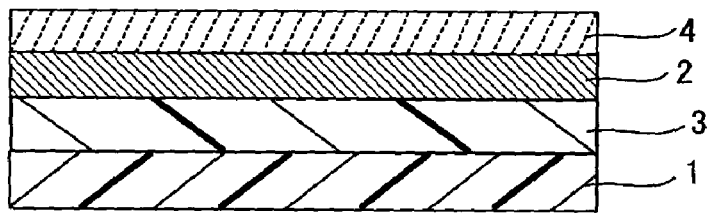
FIG. 1C schematically exemplifies the layer composition of the recordable optical recording medium according to the present invention which comprises the undercoating layer, the recording layer and the protective layer which are disposed in this order on the substrate.
Figure 1D:
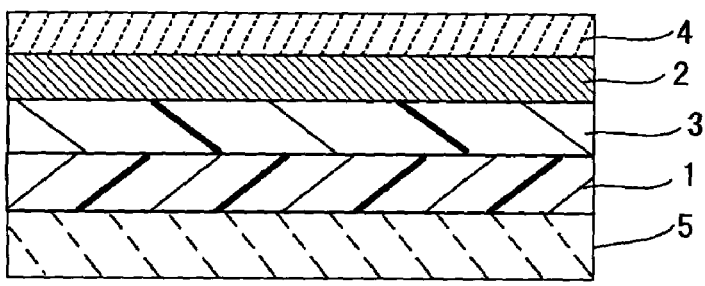
FIG. 1D schematically exemplifies the layer composition of the recordable optical recording medium according to the present invention which comprises the undercoating layer, the recording layer, the protective layer which are disposed in this order on an surface of the substrate, and the hard coat layer disposed on another surface of the substrate.

FIG. 1A to FIG. 1D schematically exemplify the layer composition of the optical recording medium according to the present invention, wherein the optical recording medium is applied to a rewritable optical disk. FIG. 1A shows an example of the layer composition in which the recording layer 2 is disposed on the substrate 1. FIG. 1B shows an example of the layer composition in which the undercoating layer 3 and the recording layer 2 are disposed, in this order on the substrate 1. FIG. 1C shows an example of the layer composition in which the undercoating layer 3, the recording layer 2 and the protective layer 4 are disposed, in this order on the substrate 1. FIG. 1D shows an example of the layer composition in which the undercoating layer 3, the recording layer 2 and the protective layer 4 are disposed, in this order on a surface of the substrate 1 and the hard coat layer 5 is disposed on another surface of the substrate 1.

Figure 2A:
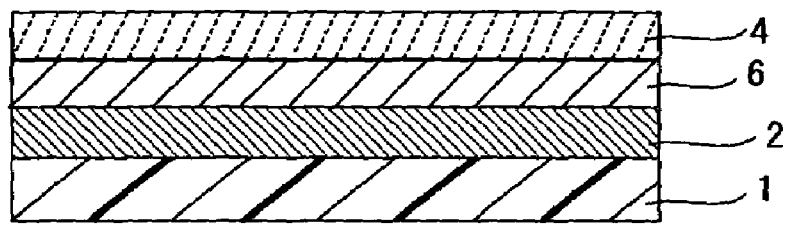
FIG. 2A schematically exemplifies the layer composition of the optical recording medium for CD-R according to the present invention which comprises the recording layer, the reflective layer and the protective layer which are disposed in this order on the substrate.
Figure 2B:
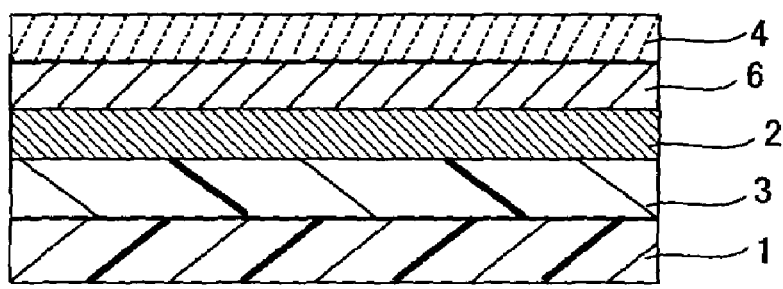
FIG. 2B schematically exemplifies the layer composition of the optical recording medium for CD-R according to the present invention which comprises the undercoating layer, the recording layer, the reflective layer and the protective layer which are disposed in this order on the substrate.
Figure 2C:
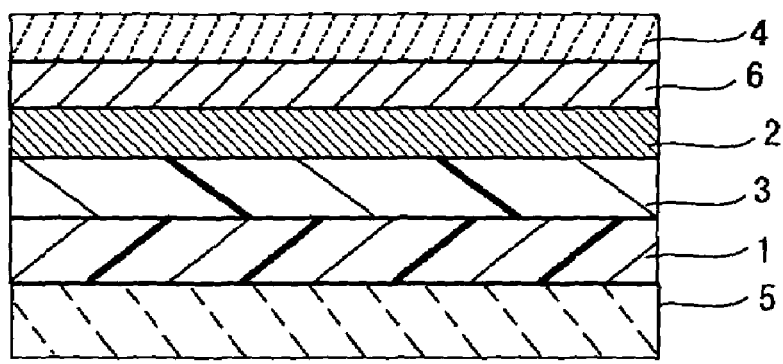
FIG. 2C schematically exemplifies the layer composition of the optical recording medium for CD-R according to the present invention which comprises the undercoating layer, the recording layer, the reflective layer, the protective layer which are disposed in this order on an surface of the substrate, and the hard coat layer disposed on another surface of the substrate.

FIG. 2A to FIG. 2C schematically exemplify the layer composition of the optical recording medium according to the present invention, wherein the optical recording medium is applied to a CD-R medium. FIG. 2A shows an example of the layer composition in which the recording layer 2, the reflective layer 6 and the protective layer 4 are disposed, in this order on a surface of the substrate 1. FIG. 2B shows an example of the layer composition in which the undercoating layer 3, the recording layer 2, the reflective layer 6 and the protective layer 4 are disposed, in this order on a surface of the substrate 1. FIG. 2C shows an example of the layer composition in which the undercoating layer 3, the recording layer 2, the reflective layer 6 and the protective layer 4 are disposed, in this order on a surface of the substrate 1 and the hard coat layer 5 is disposed on another surface of the substrate 1.

Figure 3A:
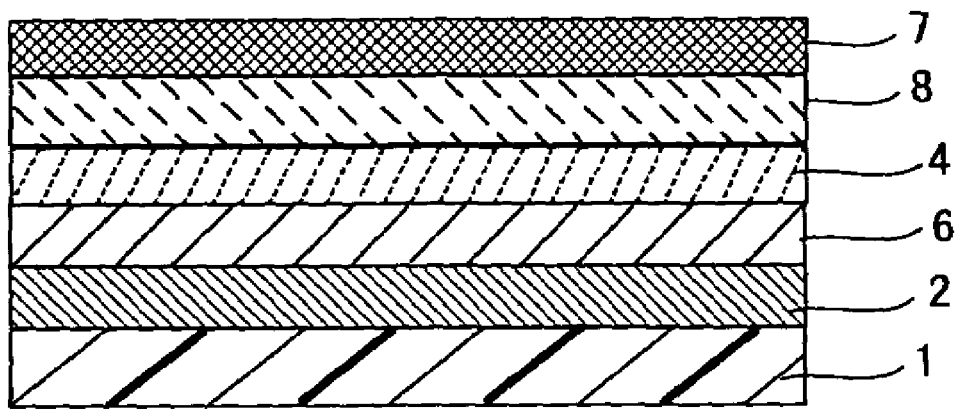
FIG. 3A schematically exemplifies the layer composition of the optical recording medium for DVD±R according to the present invention which comprises the recording layer, the reflective layer, the protective layer, the adhesive layer and the protective substrate which are disposed in this order on the substrate.
Figure 3B:
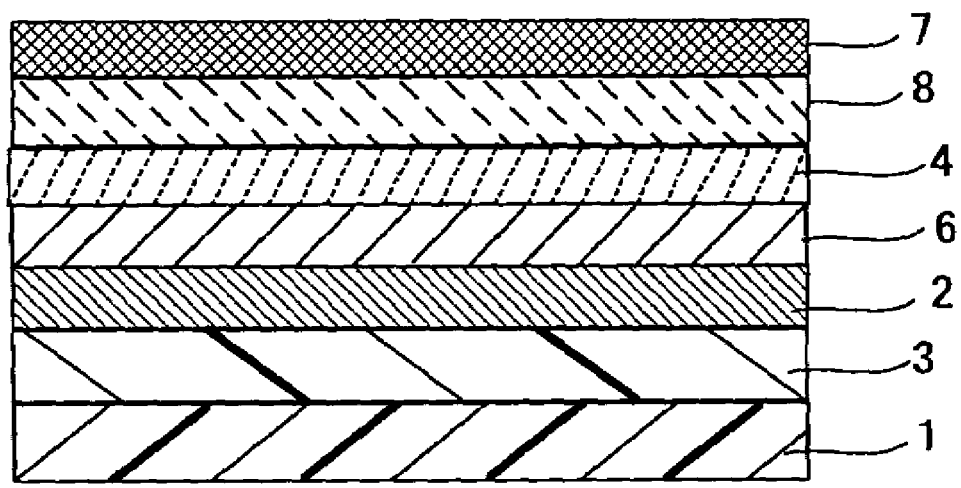
FIG. 3B schematically exemplifies the layer composition of the optical recording medium for DVD±R according to the present invention which comprises the undercoating layer, the recording layer, the reflective layer, the protective layer, the adhesive layer and the protective substrate which are disposed in this order on the substrate.
Figure 3C:
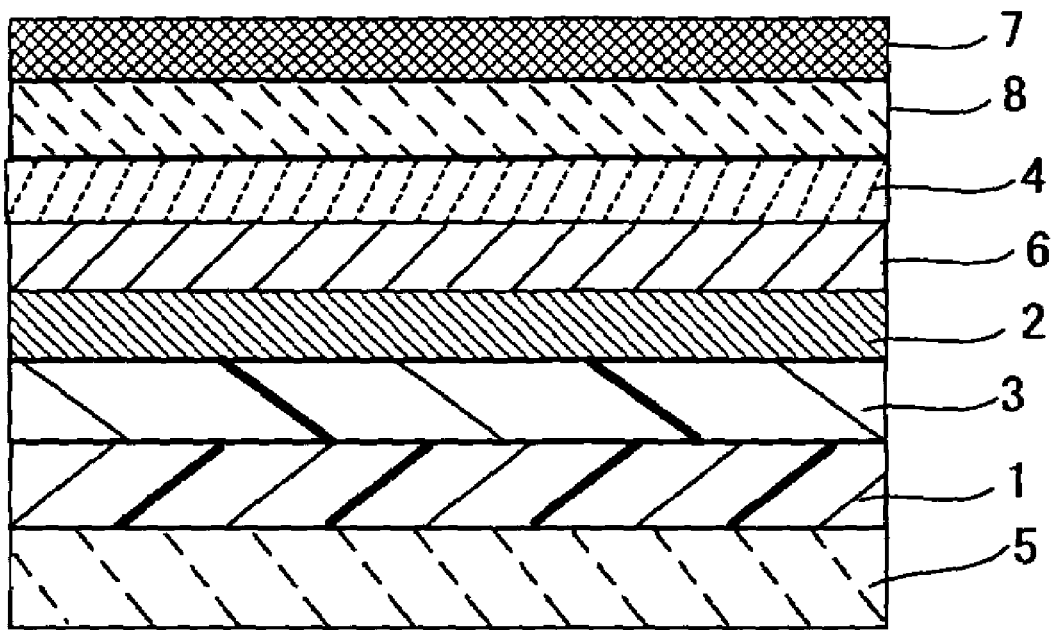
FIG. 3C schematically exemplifies the layer composition of the optical recording medium for DVD±R according to the present invention which comprises the undercoating layer, the recording layer, the reflective layer, the protective layer, the adhesive layer, the protective substrate which are disposed in this order on an surface of the substrate, and the hard coat layer disposed on another surface of the substrate.

FIG. 3A to FIG. 3C schematically exemplify the layer composition of the optical recording medium according to the present invention, wherein the optical recording medium is applied to a DVD±R medium. FIG. 3A shows an example of the layer composition in which the recording layer 2, the reflective layer 6, the protective layer 4, the adhesive layer 8 and the protective substrate 7 are disposed, in this order on the substrate 1. FIG. 3B shows an example of the layer composition in which the undercoating layer 3, the recording layer 2, the reflective layer 6, the protective layer 4, the adhesive layer 8 and the protective substrate 7 are disposed, in this order on the substrate 1. FIG. 3C shows an example of the layer composition in which the undercoating layer 3, the recording layer 2, the reflective layer 6, the protective layer 4, the adhesive layer 8 and the protective substrate 7 are disposed, in this order on a surface of the substrate 1 and the hard coat layer 5 is disposed on another surface of the substrate 1.

Further, when in the optical recording medium according to the present invention, a substrate on which layers containing the recording layer (thin film layer comprising an organic dye) are disposed, is disposed on another substrate, for example, the disposing may be performed in either such a manner that on the recording layer of a substrate (see FIG. 1A), an air layer is disposed and on the air layer, another substrate is disposed (i.e., the layer composition is an air sandwich structure of two substrates through the air layer) or such a manner that to the protective layer of a substrate (see FIG. 1C), another substrate is adhesive-bonded.

The standard layer composition of the optical recording medium according to the present invention which is applied to a recordable DVD medium, is a composition in which the first substrate and the second substrate are adhesive-bonded to each other, wherein the recording layer becomes located at the inside of the total layer composition. The recording layer may comprise only an organic dye layer or an organic dye layer on which a reflective layer comprising a metal is disposed for improving the reflectance of the recording layer. Between the recording layer and the substrate, an undercoating layer and a protective layer may be disposed and these layers may be a layer of laminated layers for improving a function of the optical recording medium. The most ordinary layer composition is a layer composition [First substrate/Organic dye layer/Metal reflective layer/Protective layer/Adhesive layer/Second substrate].

<Substrate>

The substrate should be transparent to a laser used for the recording and reproducing only in the case where the recording and reproducing is performed by irradiating the light to the surface of the substrate and when the recording and reproducing is performed by irradiating the light to the recording layer, the substrate is not necessary to be transparent.

Examples of a material for the substrate include a resin, such as a polyester resin, an acryl resin, a polyamide resin, a polycarbonate resin, a polyolefin resin, a phenol resin, an epoxy resin and a polyimide resin; a glass; a ceramic; and a metal.

In addition, it is preferred that on the surface of the substrate, a preformat, such as a guide groove, a guide pit and an address signal is formed.

The substrate has usually guide grooves having a depth of from 1,000 to 2,500 angstrom. A guide groove has usually a track pitch of from 0.7 to 1.0 µm; however, for producing an optical recording medium having a large capacity, the guide groove has preferably a track pitch of from 0.7 to 0.8 µm. The groove has preferably a width of from 0.18 to 0.40 µm in terms of a half bandwidth. It is preferred that when the groove has a width of 0.18 µm or more, a satisfactory strength of signal for tracking error can be easily obtained and when the groove has a width of 0.40 µm or less, a portion on which information is recorded may hardly be spread. Further, when the groove has a depth of 1,000 angstrom or more, satisfactory tracking signal and advantageous recording and reproducing properties can be easily obtained and when the groove has a depth of 2,500 angstrom or more, transfer properties having excellent uniformity through the whole recording medium can be obtained, therefore the above-noted range is the optimal range of the groove depth.

The optical recording medium according to the present invention can be applied to a recordable DVD medium. The most preferred wavelength of the light used for the recording and reproducing of the optical recording medium is from 630 to 700 nm and with this wavelength of an used light, the optical recording medium according to the present invention can provide excellent recording properties as a optical recording medium.

<Recording Layer>

By irradiating the laser to the recording layer, some optical changes are caused on the recording layer, so that information is recorded thereon; therefore, it is necessary that the recording layer comprises the formazan-metal chelate dye according to the present invention. The dye may be used in combination of two or more types thereof.

In addition, for improving optical properties, recording sensitivity and signal properties, the dye according to the present invention may be used either in a mixture with another organic dye, a metal or a metal compound or by laminating a layer of another organic dye, a metal or a metal compound on the layer of the dye according to the present invention.

Further, in the recording layer, various materials, such as a polymer material, such as an iomer resin, a polyamide resin, a vinyl resin and a natural polymer; a silicone; a liquid rubber; or a silane coupling agent may be dispersed and mixed. For improving properties of the recording layer, the above-noted various materials may be used in combination with a stabilizer (e.g., a complex of a transition metal), a dispersant, a flame retardant, a lubricant, an anti-static agent, a surfactant or a plasticizer.

The recording layer can be disposed by an usual process, such as the coating of a coating liquid. The coating can be performed by coating the coating liquid prepared by dissolving the above-noted dye in an organic solvent according to a conventional coating method, such as spraying, roller coating, dipping and spin coating.

Examples of the organic solvent used for the coating liquid include an alcohol, such as methanol, ethanol, isopropanol and 2,2,3,3-tetrafluoro-1-propanol; a ketone, such as acetone, methyl ethyl ketone and cyclohexanone; an amide, such as N,N-dimethylformamide and N,N-dimethylacetoamide; a sulfoxide, such as dimethylsulfoxide; an ether, such as tetrahydrofuran, dioxane, diethylether and ethyleneglycol monomethylether; an ester, such as methyl acetate and ethyl acetate; a halogenated aliphatic hydrocarbon, such as chloroform, methylene chloride, dichloroethane, carbon tetrachloride, trichloroethane; an aromatic hydrocarbon, such as benzene, xylene, monochlorobenzene and dichlorobenzene; a cellosolve, such as methoxyethanol and ethoxyethanol; and a hydrocarbon, such as hexane, pentane, cyclohexane and methyl cyclohexane. Among them, an alcohol containing a fluorine atom is preferred.

The recording layer has a thickness of preferably from 10 nm (100 angstrom) to 10 µm, more preferably from 20 to 200 nm (200 to 2,000 angstrom).

<Undercoating Layer>

Examples of the object of using the undercoating layer include (1) improving adhesive properties (2) barrier against water or a gas (3) improving the stability during the preservation of the recording layer (4) improving a reflectance (5) protecting the substrate and the recording medium from a solvent and (6) forming a guide groove, a guide pit and a preformat.

For the object (1), examples of the material for the undercoating layer include a polymer material, such as an iomer resin, a polyamide resin, a vinyl resin, a natural resin, a natural polymer, a silicone and a liquid rubber; and a silane coupling agent. For the objects (2) and (3), examples of the material for the undercoating layer include, besides the above-noted polymer materials, an inorganic compound, such as $SiO_2$, $MgF_2$, SiO, $TiO_2$, ZnO, TiN, SiN; and a metal and semi-metal, such as Zn, Cu, Ni, Cr, Ge, Se, Au, Ag and Al. For the object of (4), examples of the material for the undercoating layer include a metal, such as Al and Ag; or a thin film of an organic dye (e.g., a methine dye and a xanthene dye) having a metallic sheen. For the objects of (5) and (6), the material for the undercoating layer include an UV-curing resin, a thermosetting resin and a thermoplastic resin.

The thickness of the undercoating layer is not restricted and may be properly selected depending on the application. The thickness is preferably from 0.01 to 30 µm, more preferably from 0.05 to 10 µm.

<Reflective Layer>

A material for the reflective layer is preferably a substance having a high reflectance at the wavelength of a laser used for the recording and reproducing and examples thereof include a metal and a semi-metal, such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ca, In, Si, Ge, Te, Pb, Po, Sn, Si and SiC. Among them, from the viewpoint of obtaining a high reflectance, Au, Ag and Al are preferred. These metals and semi-metals may be used individually, in combination thereof or as an alloy thereof. Among them, more preferred is a metal or a semi-metal having a high reflectance and high corrosion resistance, such as a silver alloy, most preferred is a silver-copper alloy. Examples of a method for disposing the reflective layer by shaping to the film include a metallizing method and a sputtering method. The reflective layer has a thickness of preferably from 5 to 500 nm (50 to 5,000 angstrom), more preferably from 10 to 300 nm (100 to 3,000 angstrom).

<Protective Layer and Hard Coat Layer Disposed on Another Surface of Substrate>

Examples of the object of using the protective layer or the hard coat layer disposed on another surface of the substrate include (1) protecting the recording layer (layer for absorbing a reflected light) from scratch, dust and dirt (2) improving a stability during the preservation of the recording layer (layer for absorbing a reflected light) (3) improving a reflectance. For these objects, a material above-exemplified in the section <Undercoating Layer> may be used. Examples of an inorganic material for the protective layer and hard coat layer among the above-noted inorganic materials include SiO and $SiO_2$. Examples of an organic material for the protective layer and hard coat layer include a polymethylacrylate resin, a polycarbonate resin, an epoxy resin, a polystyrene resin, a polyester resin, a vinyl resin, a cellulose, an aliphatic hydrocarbon resin, an aromatic hydrocarbon resin, a natural rubber, a styrene-butadiene resin, a chloroprene rubber, a wax, an alkyd resin, a heat-softening resin, such as a drying oil and a rosin, a hot-melt resin and an UV-curing resin. Among them, as a material for the protective layer or the hard coat layer in the substrate surface, most preferred is an UV-curing resin which is excellent in productivity.

The protective layer or the hard coat layer disposed on another surface of the substrate has a thickness of preferably from 0.01 to 30 μm, more preferably from 0.05 to 10 μm.

The undercoating layer, the protective layer and the hard coat layer may comprise, like the recording layer depending on the application, further a stabilizer, a dispersant, a flame retardant, a lubricant, an anti-static agent, a surfactant and a plasticizer.

<Protective Substrate>

The protective substrate should be transparent to the laser used for the recording and reproducing, when the laser is irradiated to the surface of the protective substrate and when the protective substrate is used only for the object of protecting, it is not required that the protective substrate is transparent. A material which can be used as a material for the protective substrate is the same material as the above-exemplified material in the Substrate and examples thereof include a resin, such as a polyester resin, an acryl resin, a polyamide resin, a polycarbonate resin, a polyolefin resin, a phenol resin, an epoxy resin and a polyimide resin; a glass; a ceramic; and a metal.

<Adhesive Layer>

The material for the adhesive layer is not restricted so long as the material can adhesive-bond two recording media and may be properly selected depending on the application. From the viewpoint of productivity, the material is preferably a UV-curing adhesive or a hot-melt adhesive.

The method for producing the optical recording medium according to the present invention is not restricted and may be selected depending on the application. The method comprises at least a step for disposing the recording layer and a step for disposing the reflective layer, further a step for disposing the protective layer and optionally other steps.

Disposing of Recording Layer

The step for disposing the recording layer is a step in which a coating liquid comprising at least one type of the formazan-metal chelate dye represented by the formula (1) is coated on the substrate.

In the method for producing the optical recording medium according to the present invention, first, the recording layer comprising mainly at least one type of the formazan-metal chelate dye represented by the formula (1) is disposed on the substrate in which a groove and/or a pit are/is formed, either directly or through another layer by coating and shaping to the film. In other words, the recording layer is disposed by coating a coating liquid prepared by dissolving the formazan-metal chelate dye represented by the formula (1) on the substrate.

As a solvent for preparing the coating liquid, a conventional organic solvent (e.g., an alcohol, a cellosolve, a halogenated hydrocarbon, a ketone and an ether) can be used. From the viewpoint of such an advantage that the layer thickness can be controlled by controlling a density and a viscosity of the recording layer and a distilled-off temperature of a solvent in the recording layer, the spin coat process is desirable.

Between the substrate and the recording layer, the undercoating layer is disposed for improving flatness or adhesiveness of the surface of the substrate or for preventing the deterioration of the recording layer.

The undercoating layer can be disposed on the substrate by applying a coating liquid prepared by dissolving or dispersing the above-noted material for the undercoating layer in a proper solvent to the surface of the substrate according to a coating process, such as a spin coating, a dip coating and an extrusion coating.

Disposing of Reflective Layer

In the method for producing the optical recording medium according to the present invention, next, on the recording layer directly or through another layer, the reflective layer is disposed according to a vacuum film formation. In other words, by metallizing, sputtering or ion-plating the above-noted reflective material on the recording layer, the reflective layer is disposed on the recording layer.

Disposing of Protective Layer

In the method for producing the optical recording medium according to the present invention, it is preferred that on the reflective layer, the protective layer is disposed. The protective layer is disposed according to either the shaping to the film under vacuum or the coating to shape to the film of the material for the protective layer, such as the above-noted various inorganic substances and resins. As the material for the protective layer, particularly an UV curing resin is preferably used and by spin-coating the resin on the reflective layer and curing the coating by irradiating UV, the protective layer is disposed.

In the optical recording medium according to the present invention, optionally an undercoating layer, a hard coat layer and a protective substrate may be disposed.

(Method for Recording and Reproducing Optical Recording Medium)

The method for recording and reproducing the optical recording medium according to the present invention comprises irradiating a light having a wavelength of from 630 to 700 nm to the optical recording medium according to the present invention at the surface of the substrate, and performing at least one of the recording and the reproducing of signal information in the recording layer.

More specifically, while the optical recording medium is rotated at a specified lineal speed or a specified constant angle velocity, to the rotating medium, a light for the recording, such as a semi-conductive laser (for example, having an oscillated laser wavelength of 650 nm) is irradiated through an objective lens at the surface of the substrate. The recording layer absorbs the irradiated light, thereby elevating the temperature of a part of the recording layer locally and in the recording layer, a pit is caused and optical properties of the recording layer are changed, so that information can be recorded in the recording layer. The reproducing of the recorded information in the recording layer is performed by detecting a reflected light which is produced at the recording layer in which information is recorded as noted above, when a laser light is irradiated to the recording medium which is rotated at a specified lineal speed, at the surface of the substrate.

(Apparatus for Recording and Reproducing Optical Recording Medium)

The apparatus for the optical recording and reproducing according to the present invention comprises an optical recording medium in which at least one of the optical recording and reproducing of information is performed, and a light source from which a light is irradiated to the optical recording medium for performing at least one of the optical recording and reproducing, wherein an optical recording medium is the optical recording medium according to the present invention.

The apparatus for the optical recording and reproducing is not restricted and may be properly selected depending on the application. An example of the apparatus comprises a laser source from which a laser, such as a semi-conductive laser is irradiated, a collective lens collecting a irradiated laser to the optical recording medium fixed in a spindle, a detector of the laser detecting a portion of the laser irradiated from the laser source, an optical element leading the laser irradiated from the laser source to the collective lens and the laser detector, and optionally other units.

In the apparatus for the optical recording and reproducing, the laser irradiated from the laser source is led to the collective lens by the optical element and the laser collected by the collective lens is irradiated to the optical recording medium, so that the optical recording and reproducing in the optical recording medium is performed. In this procedure, a portion of the laser irradiated from the laser source is led to the laser detector, so that the laser detector can control the light amount of the laser irradiated from the laser source depending on the light amount of the laser detected by the laser detector.

The laser detector may output a detected light amount of the laser as a light amount signal in a voltage or current converted from the light amount detected by the laser detector.

Examples of the above-noted other units include a controlling unit. The controlling unit is not restricted so long as the unit can control each of the above-noted units and may be selected depending on the application. Examples of the controlling unit include a sequencer and a computer.

Since the apparatus for the optical recording and reproducing according to the present invention is equipped with the optical recording medium according to the present invention which can obtain excellent recording signal properties and can suppress the amount of the crosstalk of the recording mark, the apparatus exhibits such excellent properties as a high reflectance and a high modulation degree, so that stable recording can be obtained in the apparatus.

According to the present invention, an optical recording medium in which a recording material of the optical recording medium has a high solubility in an organic solvent, so that the recording material can be shaped to film by a coating process and the recording material is excellent in light-resistance and stability during the preservation, so that the optical recording medium is applicable to the recordable DVD, and further, by introducing a fluorine atom or a fluorinated alkyl group to the recording material, the water repellency thereof can be improved, so that it is suppressed that the recording material is buried in a guide groove and excellent recording signal qualities (such as excellent jitter properties, sensitivity, modulation degree and push-pull signal properties) of the recording medium can be obtained, and, a method and an apparatus for the optical recording and reproducing using the optical recording medium, can be provided.

Hereinbelow, the present invention will be described in more detail with reference to the following Examples and Comparative Examples, which should not be construed as limiting the scope of the present invention.

EXAMPLE 1

By spin-coating a coating liquid prepared by dissolving a mixture of a formazan-metal chelate dye No. 32 shown in Table 1-5 and a compound represented by the following formula (3):

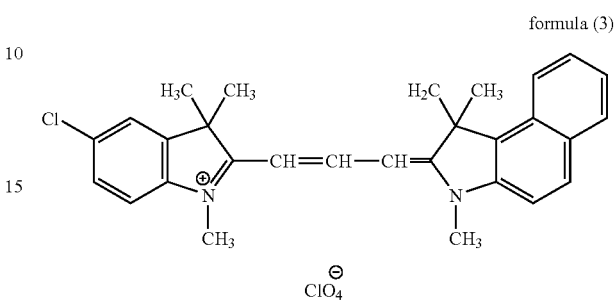

formula (3)

in a mixing mass ratio of 40:60 into tetrafluoropropanol, on a substrate made of an injection-molded polycarbonate resin having a thickness of 0.6 mm on which a guide groove having a depth of 1740 angstrom, a half bandwidth of 0.36 μm and a track pitch of 0.74 μm as formed, a recording layer having a thickness of 900 angstrom was disposed and dried at 100° C. for 30 minutes.

Next, on the recording layer, by the cathode sputtering process, a reflective layer comprising silver having a thickness of 1,200 angstrom was disposed and on the reflective layer, a protective layer made of an acryl photopolymer having a thickness of 4 μm was disposed.

Last, a protective substrate made of a injection-molded polycarbonate resin having a thickness of 0.6 mm was adhesive-bonded to the protective layer through an acryl photo polymer adhesive, thereby obtaining an optical recording medium.

EXAMPLE 2

An optical recording medium was produced in substantially the same manner as in Example 1, except that a recording layer having a thickness of 800 angstrom was disposed by spin-coating a coating liquid prepared by dissolving a mixture of a formazan-metal chelate dye No. 19 shown in Table 1-3 and a compound represented by the following formula (4) in a mixing mass ratio of 50:50 into tetrafluoropropanol.

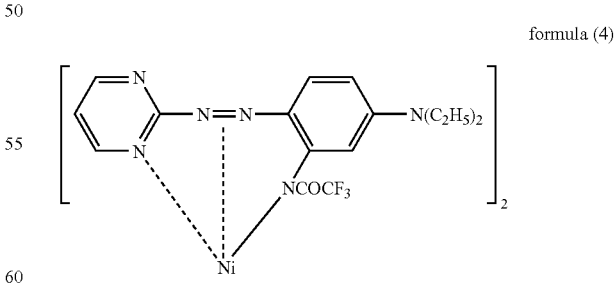

formula (4)

EXAMPLE 3

An optical recording medium was produced in substantially the same manner as in Example 1, except that a recording layer having a thickness of 700 angstrom was disposed by spin-coating a coating liquid prepared by dissolving a mixture of a formazan-metal chelate dye No. 28 shown in Table 1-5 and a compound represented by the following formula (5) in a mixing mass ratio of 55:45 into tetrafluoropropanol.

formula (5)

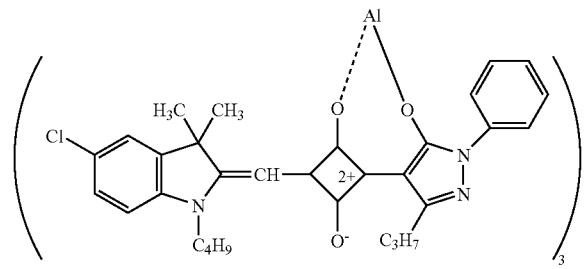

EXAMPLE 4

An optical recording medium was produced in substantially the same manner as in Example 1, except that instead of a formazan-metal chelate dye No. 32 used in Example 1, a formazan-metal chelate dye No. 5 was used.

EXAMPLE 5

An optical recording medium was produced in substantially the same manner as in Example 1, except that instead of a formazan-metal chelate dye No. 32 used in Example 1, a formazan-metal chelate dye No. 8 was used.

EXAMPLE 6

An optical recording medium was produced in substantially the same manner as in Example 1, except that instead of a formazan-metal chelate dye No. 32 used in Example 1, a formazan-metal chelate dye No. 11 was used.

EXAMPLE 7

An optical recording medium was produced in substantially the same manner as in Example 1, except that instead of a formazan-metal chelate dye No. 32 used in Example 1, a formazan-metal chelate dye No. 14 was used.

EXAMPLE 8

An optical recording medium was produced in substantially the same manner as in Example 1, except that instead of a formazan-metal chelate dye No. 32 used in Example 1, a formazan-metal chelate dye No. 26 was used.

EXAMPLE 9

An optical recording medium was produced in substantially the same manner as in Example 1, except that instead of a formazan-metal chelate dye No. 32 used in Example 1, a formazan-metal chelate dye No. 29 was used.

EXAMPLE 10

An optical recording medium was produced in substantially the same manner as in Example 1, except that instead of a formazan-metal chelate dye No. 32 used in Example 1, a formazan-metal chelate dye No. 31 was used.

EXAMPLE 11

An optical recording medium was produced in substantially the same manner as in Example 1, except that instead of a formazan-metal chelate dye No. 32 used in Example 1, a formazan-metal chelate dye No. 33 was used.

EXAMPLE 12

An optical recording medium was produced in substantially the same manner as in Example 1, except that instead of a formazan-metal chelate dye No. 32 used in Example 1, a formazan-metal chelate dye No. 34 was used.

EXAMPLE 13

An optical recording medium was produced in substantially the same manner as in Example 1, except that instead of a formazan-metal chelate dye No. 32 used in Example 1, a formazan-metal chelate dye No. 35 was used.

COMPARATIVE EXAMPLE 1

An optical recording medium was produced in substantially the same manner as in Example 1, except that a coating liquid was prepared by dissolving only a compound represented by the formula (3) into tetrafluoropropanol.

COMPARATIVE EXAMPLE 2

An optical recording medium was produced in substantially the same manner as in Example 2, except that a coating liquid was prepared by dissolving only a compound represented by the formula (4) into tetrafluoropropanol.

COMPARATIVE EXAMPLE 3

An optical recording medium was produced in substantially the same manner as in Example 1, except that instead of a formazan-metal chelate dye No. 32 used in Example 1, a formazan-metal chelate dye represented by the following formula (6) was used.

formula (6)

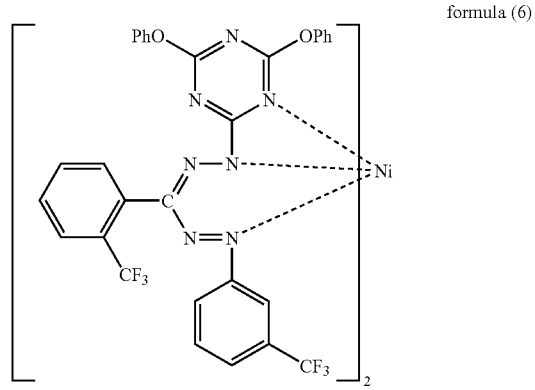

wherein "Ph" represents a phenyl group.

COMPARATIVE EXAMPLE 4

An optical recording medium was produced in substantially the same manner as in Example 1, except that instead of a formazan-metal chelate dye No. 32 used in Example 1, a compound represented by the following formula (7) was used.

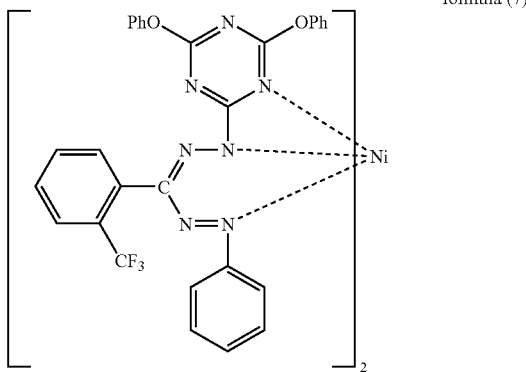

formula (7)

wherein "Ph" represents a phenyl group.

<Recording Conditions>

With respect to the optical recording medium obtained in Examples or Comparative Examples, the recording of the EFM signal (having a linear speed of 8.5 m/sec) was performed using a semi-conductive laser having an oscillated laser wavelength of 658 nm and a beam diameter of 0.9 μm, accompanied by the tracking according to an optimized multi pulse strategy and the reproducing was performed using a continuous light (having a reproducing power of 0.7 mW) of a semi-conductive laser having an oscillated laser wavelength of 658 nm, thereby measuring the reproducing waveform and the jitter.

In addition, the obtained optical recording medium was evaluated also by push-pull signal in an unrecorded part of the optical recording medium which was measured as a substitutive property for the tracking stability. The result of measurements is shown in Table 2.

TABLE 2

| | Reflectance of Unrecorded Part [%] | Recording Power [mW] | Modulation Degree | Jitter [%] | Push-pull Out put of Unrecorded Part [mV] |
|---|---|---|---|---|---|
| Ex. 1 | 52 | 12.6 | 0.65 | 7.4 | 600 |
| Ex. 2 | 49 | 12.8 | 0.69 | 7.2 | 590 |
| Ex. 3 | 51 | 12.6 | 0.69 | 7.1 | 660 |
| Ex. 4 | 50 | 12.4 | 0.66 | 7.7 | 570 |
| Ex. 5 | 49 | 13 | 0.67 | 7.6 | 610 |
| Ex. 6 | 50 | 12.6 | 0.68 | 7.7 | 600 |
| Ex. 7 | 51 | 12.7 | 0.68 | 7.4 | 570 |
| Ex. 8 | 51 | 12.8 | 0.67 | 7 | 640 |
| Ex. 9 | 50 | 12.6 | 0.66 | 7 | 640 |
| Ex. 10 | 51 | 12.7 | 0.67 | 7.1 | 650 |
| Ex. 11 | 51 | 12.9 | 0.68 | 6.9 | 650 |
| Ex. 12 | 50 | 13 | 0.69 | 7 | 660 |
| Ex. 13 | 52 | 12.8 | 0.68 | 7.1 | 640 |
| Comp. Ex. 1 | 54 | 13.6 | 0.58 | 8.9 | 400 |
| Comp. Ex. 2 | 50 | 15.6 | 0.6 | 8.1 | 420 |
| Comp. Ex. 3 | 52 | 13 | 0.66 | 7.1 | 550 |
| Comp. Ex. 4 | 52 | 13 | 0.67 | 7.2 | 540 |

As apparent from Table 2, with respect to an optical recording medium produced in Comparative Example 2, the recording power is larger than that of optical recording media produced in other Examples and Comparative Examples. It was confirmed that with respect to optical recording media produced in Comparative Examples 1 and 2, a push-pull signal is smaller than that of optical recording media produced in Examples, so that the tracking may be unstable with high possibility with respect to optical recording media produced in Comparative Examples 1 and 2 and the jitter is larger than that of optical recording media produced in Examples. Further, it was confirmed that when "α" (in the formula (2)) of the formazan-metal chelate dye according to the present invention is an unsubstituted or substituted pyrimidine group, pyrazine group or triazine group (e.g., in Example 1), the push-pull signal tends to be larger than that of an optical recording medium in which "α" is another group than the above-noted groups (e.g., in Example 4); when "A" (in the formula (2)) of the formazan-metal chelate dye is an aryl group (e.g., in Example 8), the push-pull signal tends to be larger than that of an optical recording medium in which "A" is another group than an aryl group (e.g., in Example 7); and when "A" is an aryl group having another group than a fluorinated alkyl group (according to the present invention and e.g., in Examples 8, 9, 10, 11, 12 and 13), approximately all properties are better than those of an optical recording medium in which "A" is an aryl group having a fluorinated alkyl group (according to JP-A No. 2002-293027 and e.g., in Comparative Examples 3 and 4).

Therefore, the effect of the present invention was confirmed by the comparison of properties of the optical recording medium, wherein properties of the optical recording medium according to the present invention in which the formula of a dye which is a material for the recording layer has a substituent "R" of an aryl group in the formula 2) containing a fluorine atom or a fluorinated alkyl group and an aryl group "A" in the formula (2) containing no fluorine atom are superior to properties of an optical recording medium according to another patent document (e.g., JP-A No. 2002-293027) in which the formula of a dye which is a material for the recording layer has a substituent "R" of an aryl group in the formula (2) containing no fluorine atom and an aryl group "A" in the formula (2) containing a fluorine atom or a fluorinated alkyl group

EXAMPLE 14

By spin-coating a coating liquid prepared by dissolving a mixture of the compound (3) and a formazan-metal chelate dye No. 7 in a mixing mass ratio of 8:2 into tetrafluoropropanol on a plate made of an injection-molded polycarbonate having a thickness of 1.2 mm, three samples of an organic dye film having a thickness of 1,000 angstrom was produced.

EXAMPLE 15

Three samples of an organic dye film having a thickness of 1,000 angstrom was produced in substantially the same manner as in Example 14, except that the mixing mass ratio between the compound (3) and a formazan-metal chelate dye No. 7 was changed to 6:4.

EXAMPLE 16

Three samples of an organic dye film having a thickness of 1,000 angstrom was produced in substantially the same manner as in Example 14, except that the mixing mass ratio between the compound (3) and a formazan-metal chelate dye No. 7 was changed to 0:10.

Next, each of obtained organic dye film samples was exposed to a light of xenon lamp having an illuminance of 50,000 lux and the exposure time and the change of the light absorbance by the film at a wavelength corresponding to the maximum light absorbance of the film were measured. The ratio of the residual light absorbing ability after each exposure time to 1 which is the assumed initial light absorbing ability was measured and the result of the measurement is shown in Table 3.

EXAMPLES 17 TO 19

Three samples of an organic dye film were produced in substantially the same manner as in Examples 14 to 16, except that instead of the compound (3), the compound (4) was used and instead of a formazan-metal chelate dye No. 7, a formazan-metal chelate dye No. 25 was used.

Next, each of obtained organic dye film samples was exposed to a light of xenon lamp having an illuminance of 50,000 lux and the exposure time and the change of the light absorbance by the film at a wavelength corresponding to the maximum light absorbance of the film were measured. The ratio of the residual light absorbing ability after each exposure time to 100% which is the assumed initial light absorbing ability was measured and the result of the measurement is shown in Table 3.

COMPARATIVE EXAMPLE 5

Three samples of an organic dye film were produced in substantially the same manner as in Examples 14, except that instead of the mixture used in Example 14, only the compound (3) was used.

Next, each of obtained organic dye film samples was exposed to a light of xenon lamp having an illuminance of 50,000 lux and the exposure time and the change of the light absorbance by the film at a wavelength corresponding to the maximum light absorbance of the film were measured. The ratio of the residual light absorbing ability after each exposure time to 1 which is the assumed initial light absorbing ability was measured and the result of the measurement is shown in Table 3.

COMPARATIVE EXAMPLE 6

Three samples of an organic dye film were produced in substantially the same manner as in Examples 17, except that instead of the mixture used in Example 17, only the compound (4) was used.

Next, each of obtained organic dye film samples was exposed to a light of xenon lamp having an illuminance of 50,000 lux and the exposure time and the change of the light absorbance by the film at a wavelength corresponding to the maximum light absorbance of the film were measured. The ratio of the residual light absorbing ability after each exposure time to 1 which is the assumed initial light absorbing ability was measured and the result of the measurement is shown in Table 3.

TABLE 3

| | Ratio of Residual Light Absorbing Ability (%) Exposure Time | | | |
|---|---|---|---|---|
| | 0 hours | 10 hours | 50 hours | 100 hours |
| Ex. 14 | 100 | 82 | 35 | 20 |
| Ex. 15 | 100 | 93 | 56 | 34 |
| Ex. 16 | 100 | 99 | 90 | 84 |
| Ex. 17 | 100 | 86 | 60 | 42 |
| Ex. 18 | 100 | 91 | 84 | 63 |
| Ex. 19 | 100 | 98 | 89 | 84 |
| Comp. Ex. 5 | 100 | 12 | almost 0 | almost 0 |
| Comp. Ex. 6 | 100 | 65 | 16 | 9 |

From the result shown in Table 3, it is apparent that an optical recording medium obtained in Examples exhibits remarkably excellent light stability in comparison with an optical recording medium obtained in Comparative Examples. In addition, it was confirmed that an optical recording medium comprising a formazan-metal chelate dye No. 1, 10, 13, 15, 22, 24, 33 or 39 can obtain remarkably excellent light stability.

What is claimed is:

1. An optical recording medium comprising:
a grooved substrate wherein a guide groove has a depth of 100 nm to 250 nm, and at least a recording layer disposed on the substrate in which the recording layer comprises at least one type of formazan-metal chelate dyes represented by the following formula (1):

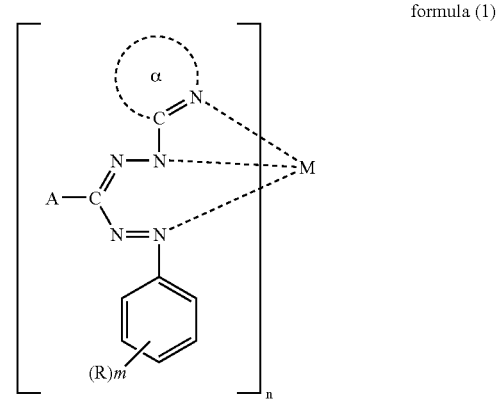

formula (1)

wherein a ring "α" represents any one of a pyridazine ring, a pyrimidine ring, a pyrazine ring, a triazine ring, a thiadiazole ring and an imidazole ring, which may be substituted by a substituent; "A" represents any one of an alkyl group which may contain a substituent, an unsubstituted aryl group, an aryl group containing another substituent than a fluorinated alkyl group, an alkenyl group which may contain a substituent and a heterocycle residue which may contain a substituent; "R" represents one of a fluorine atom and a flourinated alkyl group; "m" is a natural number representing the number of "R" and when "m" is 2 or more, "R"s may be the same or different from each other; "M" represents one of a metal atom and a metal compound; and "n" represents the number of a formazan ligand coordinating "M" and is one of 1, 2, and 3.

2. The optical recording medium according to claim 1, wherein the ring "α" is any one of a pyridazine ring, a pyrimidine ring, a pyrazine ring and a triazine ring.

3. The optical recording medium according to claim 1, wherein "M" is one member selected from the group consisting of iron, cobalt, nickel, cupper, zinc and palladium.

4. The optical recording medium according to claim 1, wherein the recording layer comprises a mixture of a formazan-metal chelate dye represented by the formula (1) and a light-absorbable dye having a wavelength corresponding to the maximum light absorbance of from 550 nm to 630 nm.

5. The optical recording medium according to claim 4, wherein the light-absorbable dye is at least one member selected from the group consisting of a polymetine dye, an azo-metal chelate dye, a squarylium dye and a squarylium-metal chelate dye.

6. The optical recording medium according to claim 4, wherein the mixing mass ratio (A:B) between the formazan-metal chelate dye (A) represented by the formula (1) and the light-absorbable dye (B) is from 1:9 to 9:1.

7. The optical recording medium according to claim 1, wherein the ratio of a residual light absorbing ability of the recording layer which was exposed to a light of a xenon lamp having an illuminance of 50,000 lux for 10 hours to an initial light absorbing ability of the recording layer, is 70% or more.

8. The optical recording medium according to claim 1, wherein with respect to a light having a wavelength of from the wavelength which is shorter than the wavelength of the light used for the recording and reproducing by 5 nm to the wavelength which is longer than the wavelength of the light used for the recording and reproducing by 5 nm, the recording layer as an individual layer has a refractive index "n" of from 1.5 to 3.0 and an extinction coefficient "k" of from 0.02 to 0.2.

9. The optical recording medium according to claim 1, wherein the recording layer has a thickness of from 10 nm to 10 μm.

10. The optical recording medium according to claim 1, wherein the substrate has guide grooves having a track pitch of from 0.7 μm to 0.8 μm and the groove has a width of from 0.18 μm to 0.40 μm in terms of a half bandwidth.

11. The optical recording medium according to claim 1, wherein a reflective layer is disposed on the recording layer.

12. The optical recording medium according to claim 11, wherein the reflective layer comprises one member selected from the group consisting of gold, silver, copper, aluminum and metal alloys thereof.

13. The optical recording medium according to claim 11, wherein a protective layer is disposed on the reflective layer.

14. The optical recording medium according to claim 1, wherein an undercoating layer is disposed between the substrate and the recording layer.

15. A method for recording and reproducing comprising:
irradiating a light having a wavelength of from 630 nm to 700 nm to the optical recording medium at the surface of the substrate, and
performing at least one of the recording and reproducing of signal information in the recording layer,
wherein the optical recording medium comprises
a grooved substrate wherein a guide groove has a depth of 100 nm to 250 nm, and
at least a recording layer disposed on the substrate in which the recording layer comprises at least one type of formazan-metal chelate dyes represented by the following formula (1):

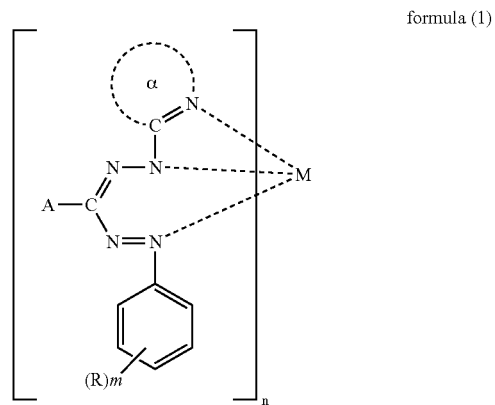

formula (1)

wherein a ring "α" represents any one of a pyridazine ring, a pyrimidine ring, a pyrazine ring, a triazine ring, a thiadiazole ring and an imidazole ring, which may be substituted by a substituent; "A" represents any one of an alkyl group which may contain a substituent, an unsubstituted aryl group, an aryl group containing another substituent than a fluorinated alkyl group, an alkenyl group which may contain a substituent and a heterocycle residue which may contain a substituent; "R" represents one of a fluorine atom and a fluorinated alkyl group; "m" is a natural number representing the number of "R" and when "m" is 2 or more, "R"s may be the same or different from each other; "M" represents one of a metal atom and a metal compound; and "n" represents the number of a formazan ligand coordinating "M" and is one of 1, 2 and 3.

16. An apparatus for the optical recording and reproducing comprising:
an apparatus configured to irradiate a light from a laser light source to the optical recording medium for performing at least one of the optical recording and reproducing,
wherein the optical recording medium is the optical recording medium according to any one of claims 1-10 and 11-14.

* * * * *